(12) United States Patent
Kim et al.

(10) Patent No.: US 8,826,251 B2
(45) Date of Patent: Sep. 2, 2014

(54) METHOD AND APPARATUS FOR DYNAMICALLY GENERATING MACHINE CODE

(75) Inventors: Gyu-young Kim, Suwon-si (KR); Je-hyung Lee, Seoul (KR); Jin-seok Oh, Seoul (KR); Seong-won Lee, Seoul (KR); Won-ki Jung, Seoul (KR); Soo-mook Moon, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 346 days.

(21) Appl. No.: 13/030,787

(22) Filed: Feb. 18, 2011

(65) Prior Publication Data

US 2011/0202908 A1 Aug. 18, 2011

(30) Foreign Application Priority Data

Feb. 18, 2010 (KR) ........................ 10-2010-0014740
Feb. 18, 2010 (KR) ........................ 10-2010-0014741

(51) Int. Cl.
*G06F 9/45* (2006.01)
*G06F 9/455* (2006.01)

(52) U.S. Cl.
CPC .................. *G06F 9/45516* (2013.01)

USPC .......................................... 717/148

(58) Field of Classification Search
None
See application file for complete search history.

(56) References Cited

U.S. PATENT DOCUMENTS

| | | | |
|---|---|---|---|
| 6,275,984 B1 * | 8/2001 | Morita | 717/151 |
| 6,678,886 B2 * | 1/2004 | Kumon | 717/151 |
| 6,934,939 B2 * | 8/2005 | Ewart et al. | 717/152 |
| 8,286,151 B2 * | 10/2012 | Chen et al. | 717/143 |
| 8,381,037 B2 * | 2/2013 | Dewitt et al. | 714/38.13 |
| 2002/0133672 A1 * | 9/2002 | Van De Waerdt et al. | 711/128 |
| 2004/0015917 A1 * | 1/2004 | Click et al. | 717/150 |
| 2004/0205319 A1 * | 10/2004 | Pickreign et al. | 711/202 |
| 2004/0225998 A1 * | 11/2004 | Van De Vanter et al. | 717/113 |
| 2008/0209420 A1 * | 8/2008 | Matsuo | 718/100 |
| 2009/0089768 A1 * | 4/2009 | Chen et al. | 717/148 |

* cited by examiner

*Primary Examiner* — Don Wong
*Assistant Examiner* — Daxin Wu
(74) *Attorney, Agent, or Firm* — The Farrell Law Firm, P.C.

(57) ABSTRACT

A method and an apparatus for dynamically generating a machine code is provided, including: sequentially storing generated instructions in a first buffer; sequentially storing data in a second buffer, when the generated instructions reference data; and flushing the first buffer and the second buffer to executable code when a distance between an instruction referencing the data and the data has reached a limit of an offset range of the data-referencing instruction.

12 Claims, 12 Drawing Sheets

METHOD AND APPARATUS FOR DYNAMICALLY GENERATING MACHINE CODE

PRIORITY

This application claims priority under 35 U.S.C. §119(a) to Korean Patent Application No. 10-2010-0014740, filed on Feb. 18, 2010, and Korean Patent Application No. 10-2010-0014741, filed on Feb. 18, 2010, in the Korean Intellectual Property Office, the entire disclosures of which are incorporated herein by reference.

BACKGROUND OF THE INVENTION

1. Field of the Invention

The present invention generally relates to a dynamic compiling environment using a virtual machine, and, more particularly, to methods and apparatuses for dynamically generating an executable machine code using a Just-In-Time (JIT) compiler.

2. Description of the Related Art

In a software execution environment in which an analyzer of a virtual machine is used, an executable machine code that is dynamically generated using a JIT compiler while executing software is used to improve the execution performance of the software. The executable machine code may access necessary data by using a Program Counter (PC)-relative load instruction or store instruction. When a fixed-length instruction is used, a range of memory, which can be accessed using the corresponding instruction, is limited according to an offset size of the instruction. Thus, executable code is generated such that an instruction and data are intertwined in the executable code.

Accordingly, so that a microprocessor does not recognize data as an instruction, a branch instruction, which causes a next instruction to be executed by skipping the corresponding data area, has to be inserted in an address right before the data area. That is, in order to connect a first code area and a second code area that are separated by a data area, a branch instruction is inserted at the end of the first code area. When the instruction and the data are arranged too sporadically, the performance of the cache memory is decreased, and further, too many branch instructions are inserted, thereby deteriorating the quality of the executable code.

In a microprocessor in which length of an instruction is fixed to a data bus length of a memory, a space for storing a memory address per an instruction is insufficient. Thus two types of instructions are provided in order to branch to a predetermined address during execution of a program. The first type is a load-based branch instruction. According to the load-based branch instruction, a branching object address or address to be branched stored as data is referenced via a PC-relative offset and is directly input to the PC. The second type is a PC-relative branch instruction, which performs branching to an address corresponding to a PC-relative offset. Regarding the load-based branch instruction, a branching object address is stored in a memory as data, and thus branching to all memory areas is possible. However, in this case, another memory space for storing the branching object address is additionally needed, and the memory storing the branching object address needs to be referenced during execution, and thus additional execution time is required. Regarding the PC-relative branch instruction, a branching object is limited to a PC-relative offset range but memory space for storing a branching object address is saved, and memory is not referenced, and thus branching requires little time.

In an environment where a executable machine code is dynamically generated as in a JIT compiler, in order to optimize a memory environment, there is an occasion when a series of instructions and data are generated, and then memory space for executable code may be allocated according to size of blocks of the generated instructions and data. In this case, an address of a branch instruction is not determined at a point when the branch instruction is generated, and thus a distance between the branch instruction and a branching object address is not known. Accordingly, if a branch instruction is required, first, a load-based branch instruction is generated and inserted into an instruction block, and then space for storing a branching object address is formed within an offset range of an instruction and the branching object address is input to the space. Later, after allocating memory space for executable code, from among the load-based branch instructions that are meanwhile generated, some load-based branch instructions whose branching objects exist within a PC-relative offset range are substituted with PC-relative branch instructions, which are relatively efficient branch instructions.

FIG. 1 illustrates switching from a load-based branch instruction to a PC-relative branch instruction in the above-described manner. Referring to FIG. 1, as a branching object 103 of a load-based instruction 101 is within a PC-relative branch instruction offset range 104, after memory for executable code is allocated, the load-based instruction 101 is substituted with a PC-relative branch instruction 111, and an offset of the substituted PC-relative branch instruction 111 is generated to indicate the branching object 103. In the above-described manner, two clock cycles consumed by one load-based branch instruction can be replaced with one clock cycle consumed by a PC-relative branch instruction, which means time can be saved this much. However, a space 102 where the branching object address of the load-based branch instruction has been stored still remains after the load-based branch instruction is substituted with a PC-relative branch instruction. Thus unnecessary space that is not used anymore is created. In order to remove this space from the executable code, the instruction and the data used by the instruction need to be rearranged so as to be continuous. Then positions of data become different, and thus an offset of the corresponding instruction needs to be readjusted, thereby decreasing efficiency.

SUMMARY OF THE INVENTION

In an environment where a cache memory for storing an instruction and a cache memory for storing data are separately used, in order to improve performance of the cache memories, locality of the instruction and the data are to be increased to thereby improve an accuracy rate of the instruction and the data stored in the cache memory. To increase the locality of the instruction and the data in executable code where the instruction and the data are intertwined, the size of a data area is to be increased as much as possible to reduce the number of data areas to thereby maximize continuity of the data and continuity of the instruction. When the number of data areas is reduced, the number of branch instructions used to branch to a next code area may also be reduced.

One or more embodiments of the present invention provide methods and apparatus for increasing locality of instructions and data by efficiently arranging the instructions and data in executable code when dynamically generating a machine code to minimize the insertion of branch instructions.

One or more embodiments of the present invention provide methods and apparatuses for dynamically generating a machine code, whereby the usage of memory is reduced by removing an unused branching object address from the executable code while a position of a branch instruction is determined later, when dynamically generating a machine code. Moreover, locality of data is increased to improve performance of the cache memory. Additionally, memory reference during execution of the branch instruction is reduced to thereby reduce execution time.

According to an aspect of the present invention, there is provided a method of dynamically generating a machine code, the method comprising: sequentially storing generated instructions in a first buffer; sequentially storing data in a second buffer, when the generated instructions reference data; and flushing the first buffer and the second buffer to executable code when a distance between an instruction referencing the data and the data has reached a limit of an offset range of the data-referencing instruction.

According to another aspect of the present invention, there is provided an apparatus for dynamically generating a machine code, the apparatus comprising: a first buffer; a second buffer; and a control unit that sequentially stores instructions in the first buffer, wherein when an instruction references data, the control unit sequentially stores the data in the second buffer, and flushes the first buffer and the second buffer to executable code when a distance between a data-referencing instruction included in the instructions and data corresponding to the data-referencing instruction has reached a limit of an offset range of the data-referencing instruction.

The control unit may further comprise a flag indicating whether the control unit performs the generating of the instruction, the generating of the data, and the flushing in a positive number offset mode or in a negative number offset mode.

According to another aspect of the present invention, there is provided a method of dynamically generating a machine code, the method comprising: generating a Program Counter (PC)-relative branch instruction if a branch instruction is required when generating an instruction; and completing the PC-relative branch instruction by fixing an offset when memory space for executable code is allocated and an address of the PC-relative branch instruction is determined.

According to another aspect of the present invention, there is provided a method of dynamically generating a machine code, the method comprising: when an instruction is a Program Counter (PC)-relative branch instruction, determining whether a branching object address is within an offset range of the PC-relative branch instruction; if the branching object address deviates from the offset range of the PC-relative branch instruction, inserting a load-based branch instruction for branching to the branching object address into executable code; setting an offset of the PC-relative branch instruction such that the PC-relative branch instruction branches to a position where the load-branched instruction is stored; and performing the above steps with respect to all instructions that are generated before memory space for the executable code is allocated.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE PRESENT INVENTION

Hereinafter, embodiments of the present invention will be described with reference to the attached drawings.

Figure 1:
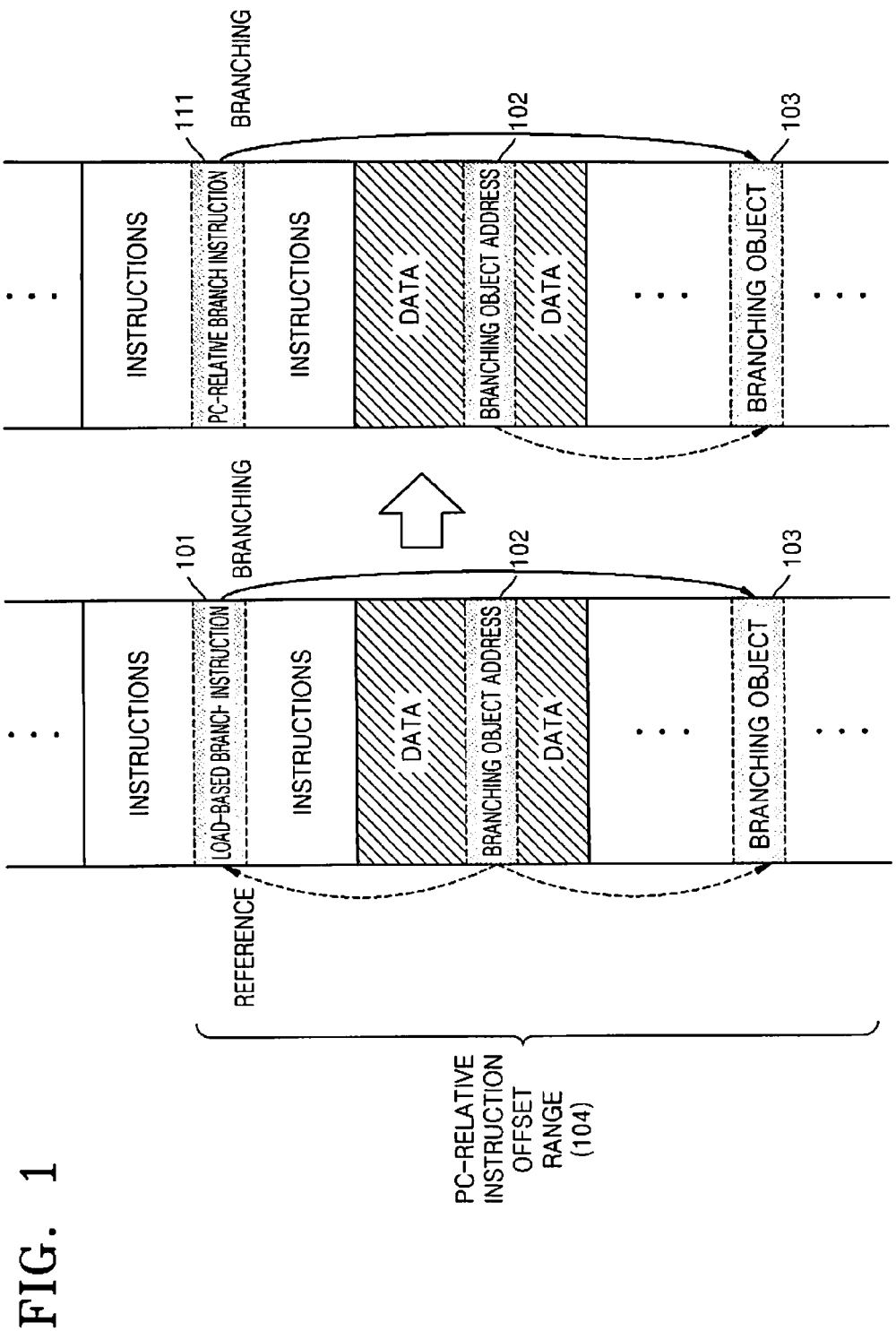
FIG. 1 illustrates switching from a load-based branch instruction to a Program Counter (PC)-relative branch instruction, according to the conventional art.
Figure 2:
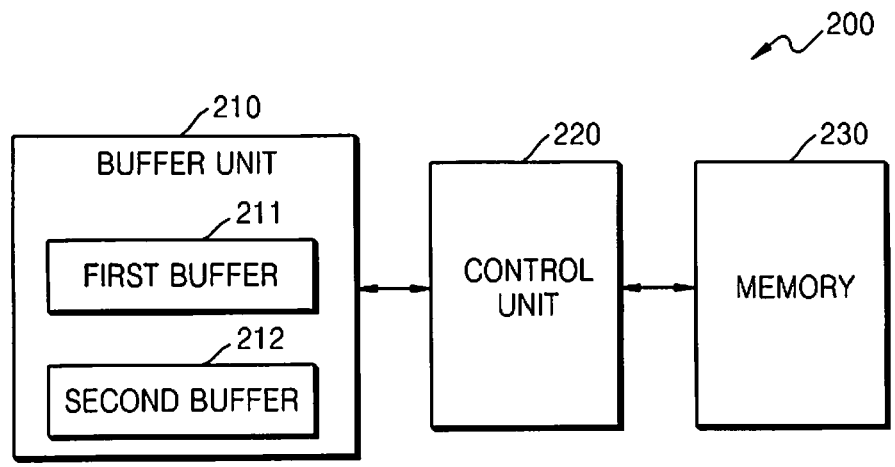
FIG. 2 illustrates a block diagram of an apparatus for dynamically generating a machine code, according to an embodiment of the present invention.

FIG. 2 is a block diagram of an apparatus 200 for dynamically generating a machine code, according to an embodiment of the present invention.

Referring to FIG. 2, the apparatus 200 includes a buffer unit 210 including a first buffer 211 for temporarily storing a generated instruction and a second buffer 212 for temporarily storing data, and a control unit 220 that sequentially stores generated instructions in the first buffer 211, sequentially stores corresponding data in the second buffer 212 when the instruction references data, and flushes the first buffer 211 and the second buffer 212 to executable code when a distance between a data-referencing instruction stored in the first buffer 211 and data corresponding to the instruction has reached a limit of an offset range of the data-referencing instruction. The buffer unit 210 is separately illustrated from a memory 230 used to store a completed executable code, but the buffer unit 210 may be located on the memory 230. Moreover, the apparatus 200 may include a flag (not shown) indicating whether the control unit 220 is performing the flushing and the generating a block of the instruction and a block of the data in a positive number offset mode or in a negative number offset mode. Also, the control unit 220 may be a JIT compiler. The function of the control unit 220 and various examples thereof will be described later in detail with reference to FIGS. 3 through 9.

Instructions that are temporarily stored in a buffer and a series of data corresponding to the instructions are referred to as an instruction block and a data block, respectively. Further, a set of instructions and a set of data added to executable code are referred to as a code area and a data area, respectively.

Figure 3:
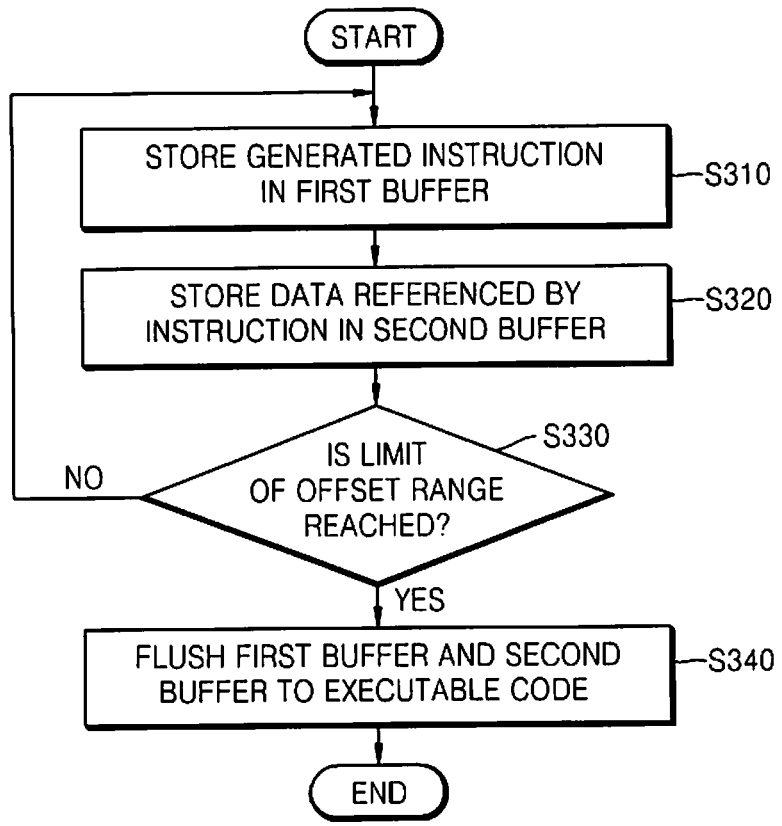
FIG. 3 is a flowchart illustrating a method of dynamically generating a machine code, according to an embodiment of the present invention.

FIG. 3 is a flowchart illustrating a method of dynamically generating a machine code, according to an embodiment of the present invention.

Referring to FIG. 3, an instruction generated as a first one is stored in a first buffer in step S310. When the generated instruction references data, that is, when the generated instruction is an instruction using a Program Counter (PC)-relative offset, data being referenced by the instruction is stored in a second buffer in step S320. The instruction and the data are repeatedly stored one-by-one with respect to the generated instructions until a limit of the offset range of the data-referencing instruction is reached. When an instruction block and a data block are added to executable code after an instruction and/or data is additionally stored in the first buffer and/or the second buffer to complete the instruction block and the data block, if data-referencing instructions included in the instruction block can reference corresponding data, this means that the limit of the offset range has not been reached. On the other hand, when an instruction block and a data block are added to executable code after an instruction and/or data is additionally stored in the first buffer and/or the second buffer to complete the instruction block and the data block, if data-referencing instructions included in the instruction block cannot reference corresponding data, this means that the limit of the offset range has been reached. When the limit of the offset range is reached in step S330, the first buffer and the second buffer are flushed to the executable code in step S340. In other words, the instruction block generated in the first buffer and the data block generated in the second buffer are added to the executable code and contents of the first buffer and the second buffer are deleted. When the limit of the offset range is not reached in step S330, the method returns to step S310 to generate a next instruction.

Figure 4:
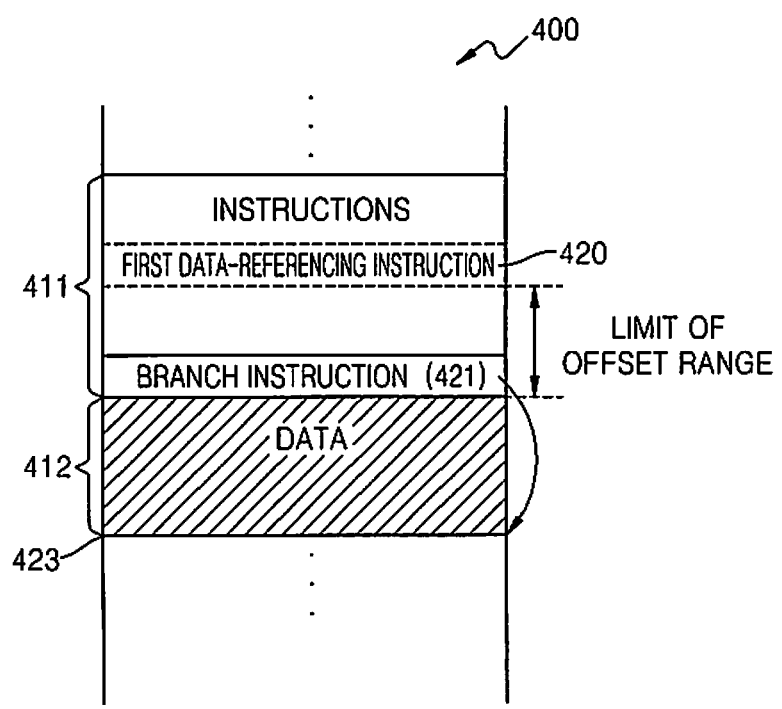
FIG. 4 illustrates an operation of adding an instruction block and a data block to executable code, according to an embodiment of the present invention.

FIG. 4 illustrates an operation of adding an instruction block and a data block to executable code 400, according to an embodiment of the present invention.

Referring to FIGS. 2 and 4, the instruction block generated in the first buffer 211 and the data block generated in the second buffer 212 are added to the executable code 400, and a branch instruction 421 is inserted between the instruction block and the data block. The branch instruction 421 is for branching to a start 423 of a next code area. An instruction block to be generated next will be inserted into the next code area. Thus, one code area 411 and one data area 412 are generated in the executable code 400. An instruction block and a data block to be generated next are to generate a next code area and a data area in a next space of the executable code 400 in a similar manner.

Referring to FIGS. 2 and 4, while respectively storing instructions and data that are generated one-by-one, in the first buffer 211 and the second buffer 212, contents of the first and second buffers 211 and 212 are written to the executable code 400 before deviating from the offset range. That is, the instructions and the data are placed in the executable code 400 such that the data area 412 starts within the limit of the offset range of a first data-referencing instruction 420 in the code area 411. When calculating the limit of the offset range, the size of memory occupied by the branch instruction 421 to be inserted before the data area 412 also has to be considered.

Figure 5:
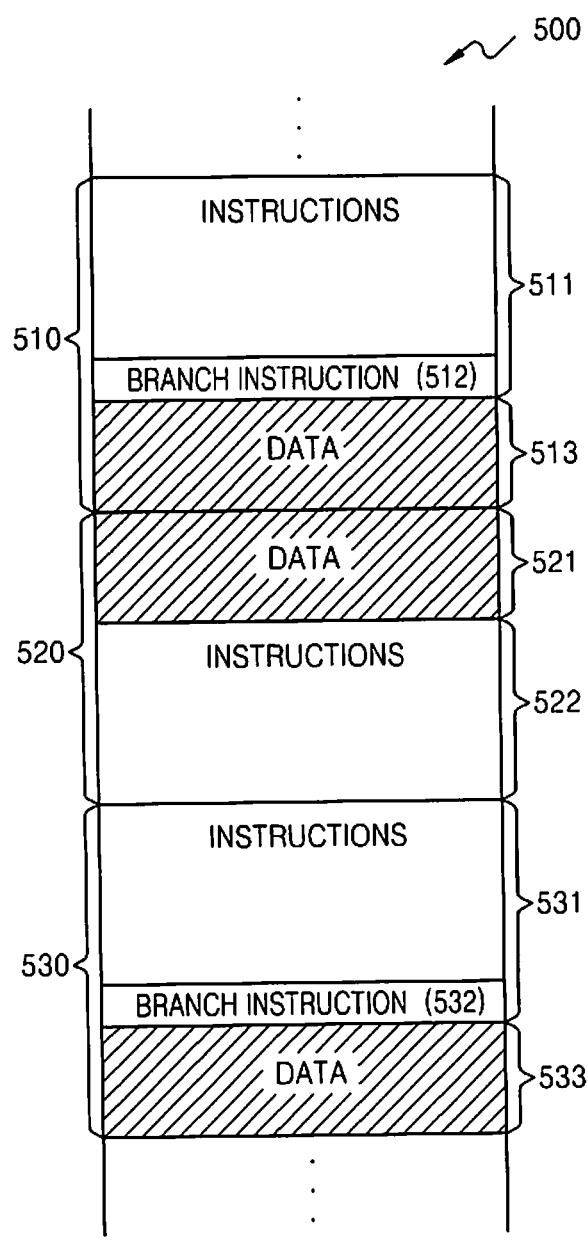
FIG. 5 illustrates an operation of adding an instruction block and a data block to executable code while converting between a positive number offset mode and a negative number offset mode, according to an embodiment of the present invention.

FIG. 5 illustrates an operation of adding an instruction block and a data block to executable code while converting between a positive number offset mode and a negative number offset mode, according to an embodiment of the present invention.

Referring to FIG. 5, while converting between a positive number offset mode and a negative number offset mode, code areas 511, 522, and 531 and data areas 513, 521, and 533 are generated in executable code 500. As a result, the executable code 500 is filled in the order of a positive number offset usage area 510, a negative number offset usage area 520, and a positive number offset usage area 530.

Referring to FIGS. 2 and 5, the positive number offset usage area 510 is generated as follows. In a positive number offset mode, an instruction block and a data block are generated. While sequentially generating instructions one-by-one, if data used by the instructions is generated, the data is sequentially stored in the second buffer 212, which is another separate storage space. Since it is in the positive number offset mode, the instructions generated one-by-one may be directly added to the executable code 500. Alternatively, an instruction block may be generated by storing the instructions in another separate first buffer 211 and when a distance between at least one of data referencing instructions included in the instruction block and corresponding data in the data block has reached the limit of the offset range, the instructions of the first buffer 211 may be added to the executable code 500 at a time. In the positive number offset usage area 510, a branch instruction 512 for branching to a next code area 522 is inserted to an end of the instruction block of the code area 511, and the data area 513 is generated after the branch instruction 512. Thus, when calculating the limit of the offset range, a space occupied by the branch instruction 512 also needs to be considered. As the positive number offset usage area 510 is filled, the first buffer 211 and the second buffer 212 are emptied, and the positive number offset mode is converted to a negative number offset mode.

The negative number offset usage area 520 is generated as follows. Instructions are generated starting from a next instruction to the instruction generated in the previous code area 511, and the instructions are stored one-by-one in the first buffer 211, and if data referenced by the instructions is generated during this step, the data is sequentially stored in the second buffer 212. When a distance between the at least one data-referencing instruction included in the instruction block generated in the first buffer 211 and corresponding data in the data block generated in the second buffer 212 has reached the limit of the offset range, the first buffer 211 and the second buffer 212 are flushed to the executable code 500. The negative number offset usage area 520 is filled in the order of the data area 521 and the code area 522, and an extra branch instruction is not inserted. The first buffer 211 and the second buffer 212 are emptied, and the negative number offset mode is converted to the positive number offset mode again.

A positive number offset usage area 530 is generated in the same process as the previous positive number offset usage area 510; that is, the positive number offset usage area 530 is filled with the code area 531, in which a branch instruction 532 for branching to a next code area (not shown) is inserted at an end, and the data area 533.

Referring to FIG. 5, the data area 513 of the positive number offset usage area 510 and the data area 521 of the negative number offset usage area 520 constitute one integrated data area, and the code area 522 of the negative number offset usage area 520 and the code area 531 of the positive number offset usage area 530 constitute one integrated code area. That is, data is gathered in maximal groups of data, and instructions are gathered in maximal groups of instructions, thereby maximizing locality of instructions and data. Consequently, cache accuracy rate is increased in an environment where cache memories are separately used for instructions and data, and, thus, time needed for reading of instructions or data that are not obtained from the cache memories from a main memory is reduced, thereby reducing program execution time. Moreover, the number of branch instructions may be reduced as much as possible, thereby saving the memory capacity and clock cycles consumed by the branch instructions.

Figure 6:
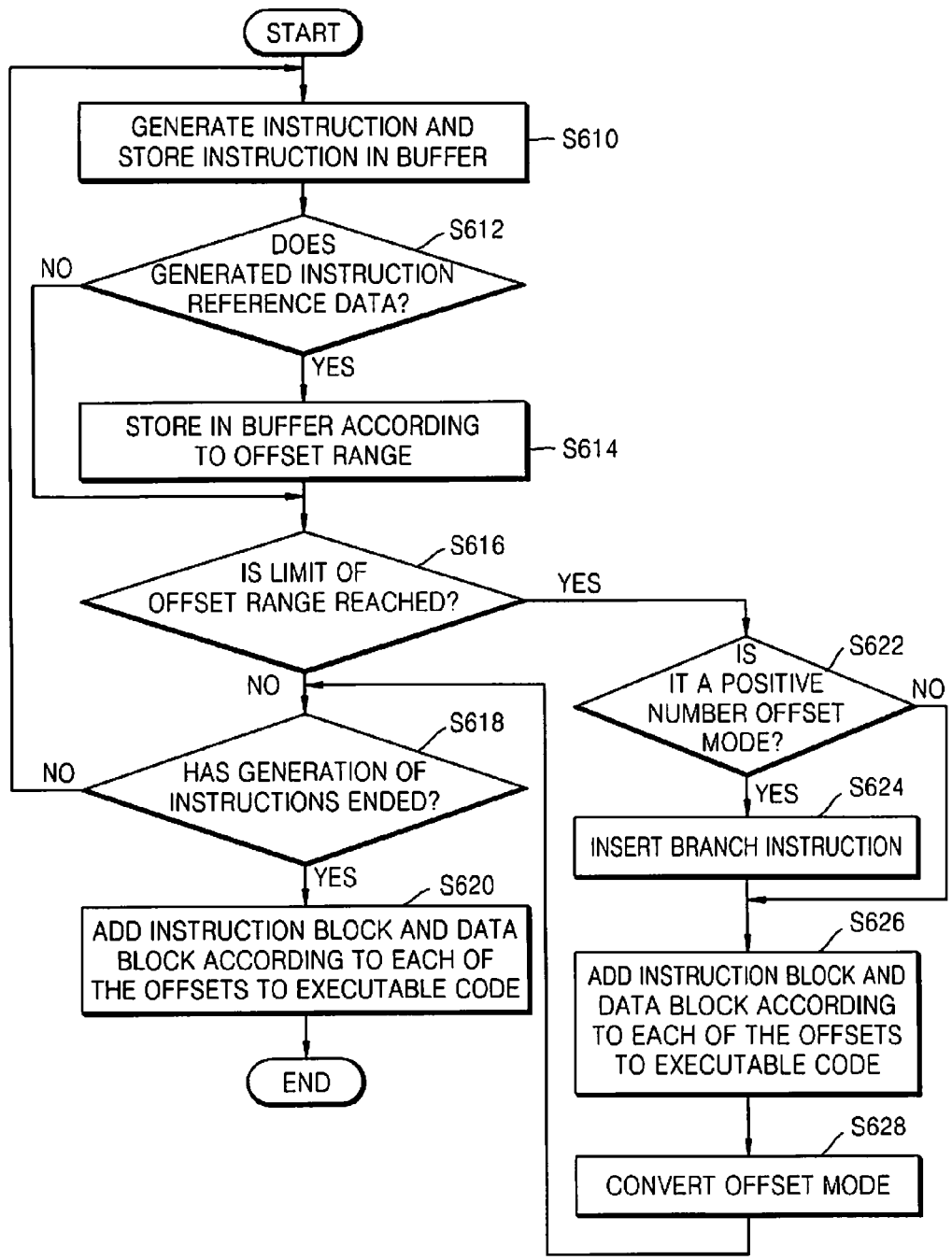
FIG. 6 is a flowchart illustrating a method of dynamically generating a machine code, according to another embodiment of the present invention.

FIG. 6 is a flowchart illustrating a method of dynamically generating a machine code, according to another embodiment of the present invention, when a plurality of instructions having different offset ranges are intertwined.

Referring to FIG. 6, in step S610, first, an instruction is generated and stored in an instruction buffer. In step S612, whether the generated instruction references data is determined. In step S614, if data is generated while the instruction is being generated, the data is stored in a separate storage space; here the data is stored in another buffer according to the offset range. When two types of instructions are intertwined, data for an instruction having a smaller offset is stored in a first data buffer, and data for an instruction having a greater offset is stored in a second data buffer. Next, in step S616, whether data blocks may be inserted within an offset range of the instructions included in the instruction block is determined to determine whether the limit of the offset range has been reached. When the limit of the offset range of the instructions is reached regardless of the type of the instructions and thus a time point when data is to be inserted is reached, the method proceeds to step S622 to insert temporarily stored instructions and all pieces of data at once to executable code. When the limit of the offset range is not reached yet in step S616 and the generation of instructions is not completed yet in step S618, the method returns to step S610 to continue generating instructions.

In step S622, before adding the instructions and data to the executable code, whether an offset mode is a positive number offset mode is checked. In a positive number offset mode, a branch instruction is inserted into the last address of a code area in step S624 and the instruction buffer and the data buffers for each of the offsets all using are flushed to the executable code in step S626. When the offset mode is a negative number offset mode, the instruction blocks and the data blocks for each of the offsets are added to the executable code without inserting a branch instruction in step S626. When adding data blocks, data for an instruction having a smaller offset is placed adjacent to the code area, and the greater the offset, the farther from the code area. Next, in step S628, when the current offset mode is a positive number offset mode, the offset mode is converted to a negative number offset mode, and vice versa.

When the generation of instructions is completed in step S618, the instruction block stored in the current instruction buffer and the data blocks stored in the data buffer for each of the offsets are added to the executable code in step 620 and the method is ended. Here, also, data for an instruction having a smaller offset is placed adjacent to the code area, and the greater the offset, the farther the data blocks are placed from the code area. When there are remaining instructions to be processed, the method returns to step S610.

As described above, according to the current embodiment of the present invention, an environment of using a plurality of offset ranges can be supported, and thus a code generator may choose an increased variety of instructions.

Figure 7:
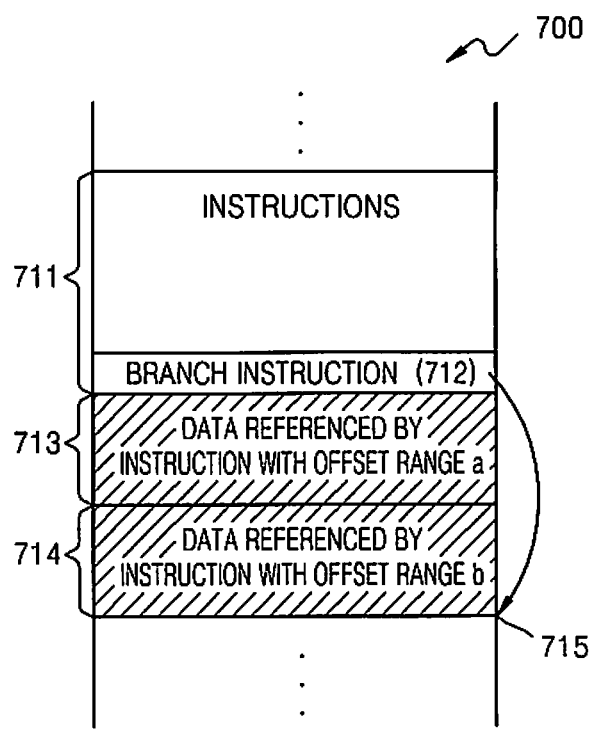
FIG. 7 illustrates an operation of adding an instruction block and a data block to executable code when two types of instructions having different offset ranges are intertwined, according to an embodiment of the present invention.

FIG. 7 illustrates an operation of adding an instruction block and a data block to executable code when two types of instructions having different offset ranges are intertwined, according to an embodiment of the present invention.

Referring to FIG. 7, an instruction block generated in a positive number offset mode and a branch instruction 712 to a start position 715 of a next code area are added to executable code 700 to form a code area 711, and two data blocks having different offset ranges have formed two data areas 713 and 714 next to the code area 711 (where a <b). When only the positive number offset mode is employed, next code areas and data areas may also be generated in the same manner as described above.

Figure 8:
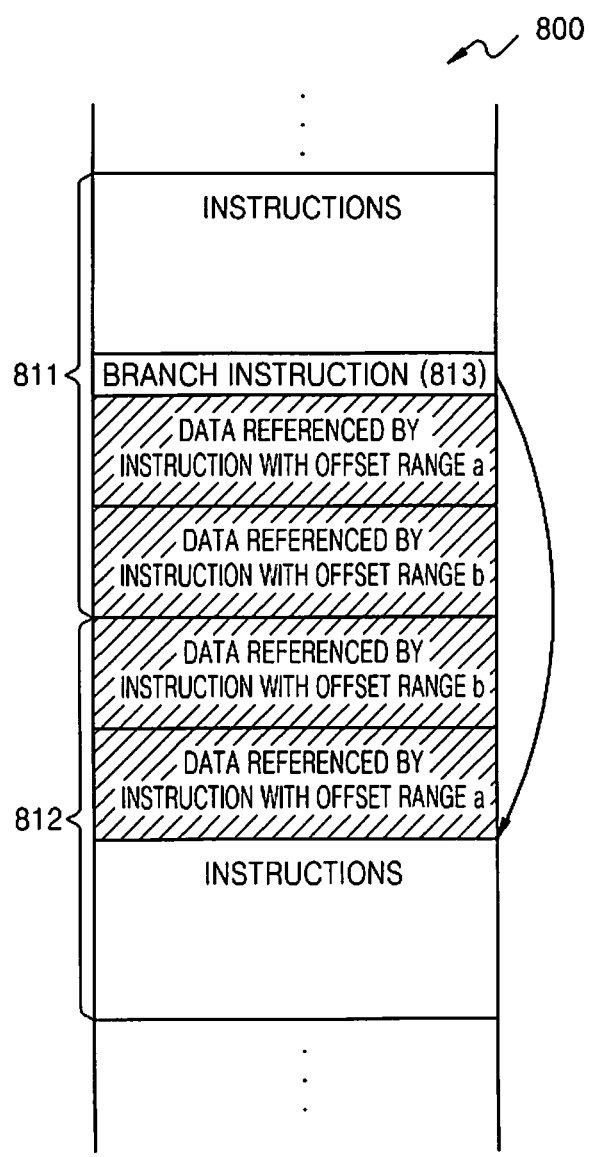
FIG. 8 illustrates an operation of adding an instruction block and a data block to executable code while converting between a positive number offset mode and a negative number offset mode when two types of instructions having different offset ranges are intertwined, according to an embodiment of the present invention.

FIG. 8 illustrates an operation of adding an instruction block and a data block to executable code while converting between a positive number offset mode and a negative number offset mode when two types of instructions having different offset ranges are intertwined, according to an embodiment of the present invention.

Referring to FIG. 8, a positive number offset usage area 811 is formed in the similar manner as that of the embodiment of FIG. 7. Here, similarly, a branch instruction 813 is inserted to branch to a code area of a next negative number offset usage area 812. In the negative number offset area 812, a data area for instructions having a greater offset, a data area for instructions having a smaller offset, and a code area are sequentially placed. A code area of a next positive number offset usage area is to be placed after the negative number offset area 812, and, thus, a branch instruction needs not be inserted into the negative number offset area 812.

Figure 9:
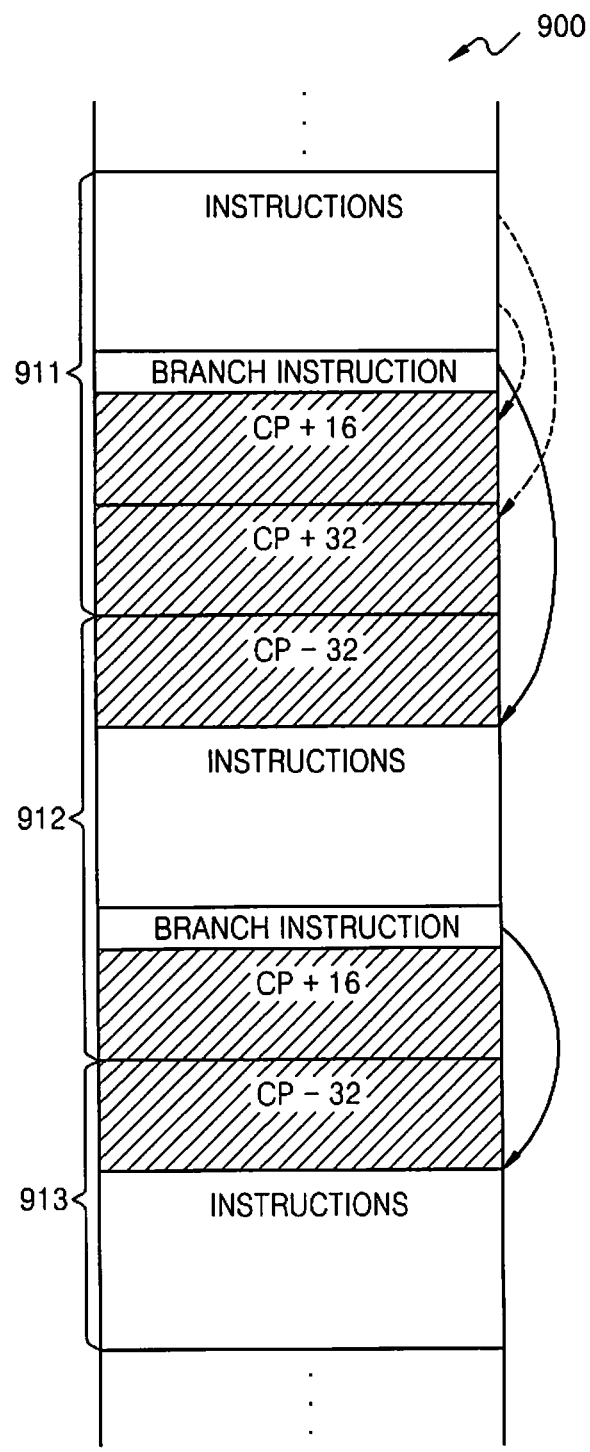
FIG. 9 illustrates an operation of adding an instruction block and a data block to executable code when two types of instructions having different offset ranges are intertwined, according to another embodiment of the present invention.

FIG. 9 illustrates an operation of adding an instruction block and a data block to executable code when two types of instructions having different offset ranges are intertwined, according to another embodiment of the present invention. Here, a 16-bit instruction and a 32-bit instruction are used together. In the current embodiment, it is assumed that the 16-bit instruction does not support a negative number offset.

In the embodiment of FIG. 9, an instruction buffer, a Constant Pool (CP) buffer for storing a constant for a 32-bit instruction (CP32), and a CP buffer for storing a constant for a 16-bit instruction (CP16) are used. A CP32 has a flag that indicates whether an offset mode is a positive number offset mode or a negative number offset mode. A CP32 with a flag indicating the positive number offset mode is referred to as a CP+32 buffer and a CP32 with a flag indicating the negative number offset mode is referred to as a CP−32 buffer. That is, three types of data buffers, namely, CP+32, CP−32, and CP+16, are used. When a distance between a generated data-referencing instruction and a corresponding constant thereto reaches a limit of an offset range, the instruction buffer and the data buffers are flushed to a code buffer 900 in which executable code is temporarily stored.

The code buffer 900 is filled as follows. When a constant is to be generated while generating instructions one-by-one, a constant is added to a CP32 buffer when the instruction is a 32-bit load instruction, and when the instruction is a 16-bit load instruction, a constant is added to a CP+16 buffer. The CP 32 buffer is a CP+32 buffer in a positive number offset mode, and is a CP−32 buffer in a negative number offset mode. When deviating from an offset range with respect to at least one of the load instructions of the instruction buffer due to the addition of a new instruction, in the positive number offset mode, the instruction buffer and the data buffers are flushed to the code buffer 900 in the form as a first area 911, and, in the negative number offset mode, in the form as a second area 912. Next, the offset mode is converted.

While CP−32 is filled with 32-bit load instructions, when the size of the instruction buffer reaches the limit of the offset range of the 32-bit load instructions, the instruction buffer and the CP−32 buffer are flushed to the code buffer 900 in the form as a third area 913. The offset mode is then converted to a positive number offset mode. When generation of executable code regarding one function is completed, contents of the code buffer 900 are copied to a code cache.

As described above, the first area 911 in the form of [code, CP+16, CP+32], the second area 912 in the form of [CP−32, code, CP+16], and the third area 913 in the form of [CP−32, code] are each flushed to executable code as a unit. Consequently, two CP patterns such as {CP+16, CP+32, CP−32} or {CP+16, CP−32} are created, and, thus, data used by instructions using a PC-relative offset may be collected and inserted into executable code as much as possible.

Figure 10:
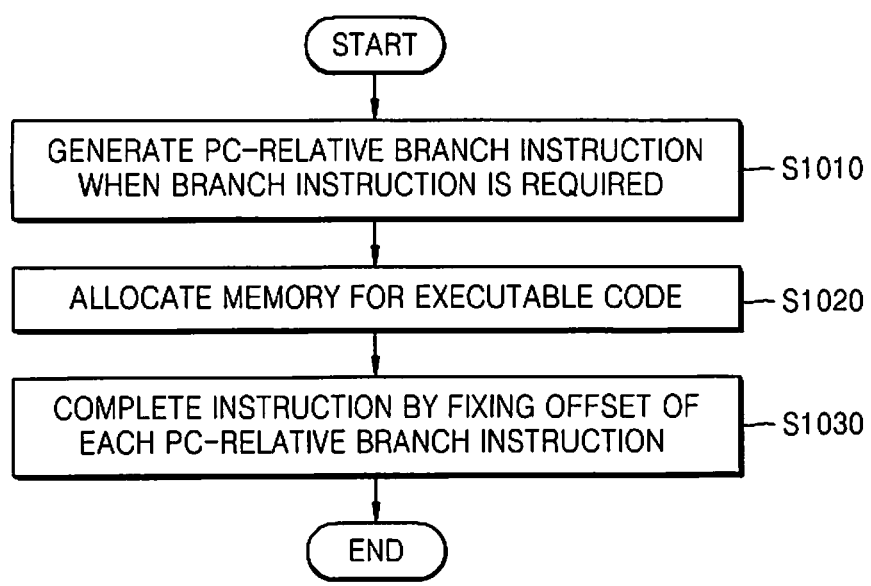
FIG. 10 is a flowchart illustrating a method of dynamically generating a machine code, according to another embodiment of the present invention.

FIG. 10 is a flowchart illustrating a method of dynamically generating a machine code, according to another embodiment of the present invention.

Referring to FIG. 10, when generating instructions using a JIT compiler one-by-one, if a corresponding instruction is a branch instruction, a PC-relative branch instruction is selected first. That is, in step S1010, when a branch instruction is required when generating instructions, a PC-relative branch instruction is generated instead of a load-based branch instruction. Since memory for executable code is not allocated yet, the position of the PC-relative branch instruction is not determined and thus an offset of the PC-relative branch instruction cannot be fixed. In step S1020, when an address of the PC-relative branch instruction is determined as memory space for the executable code is allocated, an offset of the PC-relative branch instruction is fixed to complete the PC-relative branch instruction in step S1030. The offset of each of PC-relative branch instructions may be calculated using an address of an object to be branched by the PC-relative branch instruction and the address of the PC-relative branch instructions.

When generating PC-relative branch instructions for the first time, the offset is not fixed, and, thus, a following method may be used. When generating PC-relative branch instructions, addresses of corresponding branching objects are stored according to the generated order in a temporary storage space, and an index of the addresses of branching objects stored in the temporary storage space is recorded temporarily instead of the offset of the PC-relative branch instructions. Later, when memory space for executable code is allocated and the position of the PC-relative branch instructions is determined, the addresses of branching objects are obtained from the temporary storage space using the indices recorded in the PC-relative branch instructions. The offset of the PC-relative branch instructions is fixed by subtracting the addresses of the PC-relative branch instructions from the obtained addresses of the branching objects, and by inputting the offset in a position where the index is stored, the PC-relative branch instructions are completed.

Figure 11:
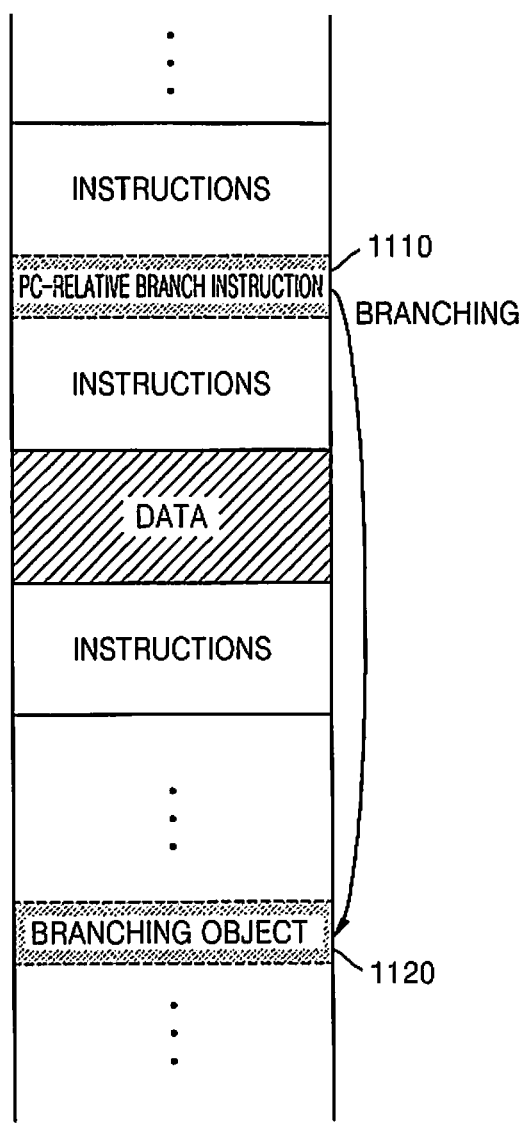
FIG. 11 illustrates a executable code generated by selecting a PC-relative branch instruction, according to an embodiment of the present invention.

FIG. 11 illustrates executable code generated by selecting a PC-relative branch instruction, according to an embodiment of the present invention.

Referring to FIG. 11, a branch instruction, which is required while instructions are generated, is inserted as a PC-relative branch instruction 1110. The complete PC-relative branch instruction has a relative position of a branching object address as an offset value, and, thus, branching may be immediately performed to a branching object address 1120 by the PC-relative branch instruction. Moreover, the unused space 102 for storing the branching object address of the load-based branch instruction, which is created when the load-based branch instruction is generated and then substituted with a PC-relative branch instruction, is not generated.

When calculating the offset to complete the PC-relative branch instruction 1110, when the offset exceeds a branchable range by the PC-relative branch instruction 1110, an exception handling process is required. For example, a load-based branch instruction may be further generated. A load-based branch instruction is added to the last position of executable code generated up to the present, and the previous PC-relative branch instruction 1110 is directed to an additionally generated load-based branch instruction.

Figure 12:
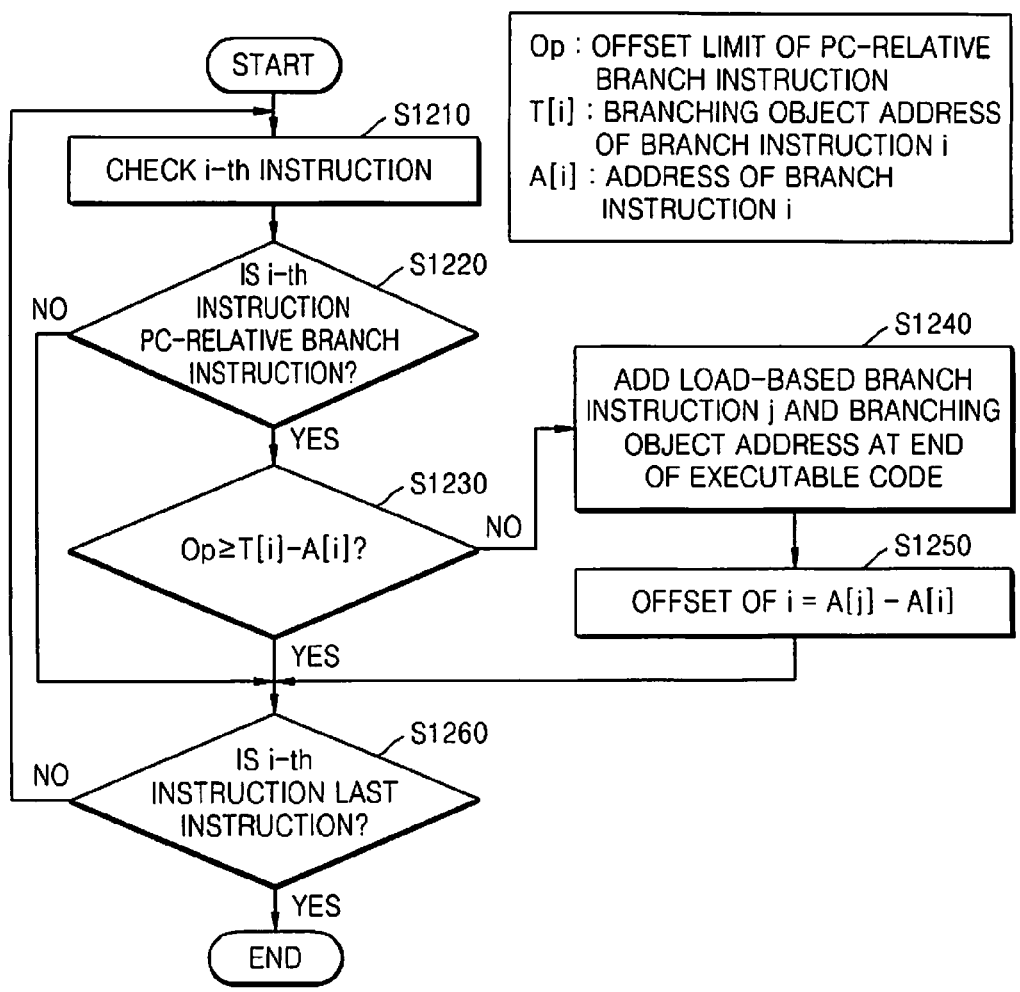
FIG. 12 is a flowchart illustrating a method of dynamically generating a machine code, according to another embodiment of the present invention.

FIG. 12 is a flowchart illustrating a method of dynamically generating a machine code, according to another embodiment of the present invention. The method is related to a method of processing a PC-relative branch instruction that cannot be branched to a corresponding branching object address after generating a series of instructions.

First, instructions are checked one-by-one to determine whether the instructions are PC-relative branch instructions. In step S1210, an i-th instruction is checked, and in step S1220, if the i-th instruction is not a PC-relative branch instruction, the method proceeds to step S1260 to process a next instruction. In step S1220, when the i-th instruction is a PC-relative branch instruction, it is determined whether branching to a corresponding branching object address within an offset range of the instruction is possible in step S1230. When a limit of an offset of a PC-relative branch instruction is "Op, a branching object address of an i-th instruction is T[i], and an i-th instruction is A[i], an offset of the PC-relative branch instruction is calculated as T[i]−A[i], and if Op≥T[i]−A[i], branching to a branching object address by using the current PC-relative branch instruction is possible. When the calculated offset is within the branchable range, the offset may be written as an offset of the corresponding PC-relative branch instruction to complete the instruction. In step S1260, if the i-th instruction is not the last instruction, the method proceeds to step S1210 to process a next instruction, and if the i-th instruction is the last instruction, the method is ended.

In step S1230, if Op<T[i]−A[i], direct branching to a branching object address by the current PC-relative branch instruction is impossible. In order to solve this problem, a load-based branch instruction used to branch to T[i] may be further inserted at a branchable position by the PC-relative branch instruction. In step S1240, for example, a load-based branch instruction j and a branching object address T[i] are added at an end of executable code being generated. The added load-based branch instruction j loads the branching object address T[i] to a PC to branch to the branching object address T[i]. In step S1250, A[j]−A[i] is input to the offset of the current PC-relative branch instruction so as to branch to the position where the added load-based branch instruction j is stored. As such, when direct branching by the PC-relative branching instruction is not possible, branching to the branching object address T[i] is performed via the additional load-based branch instruction.

Figure 13:
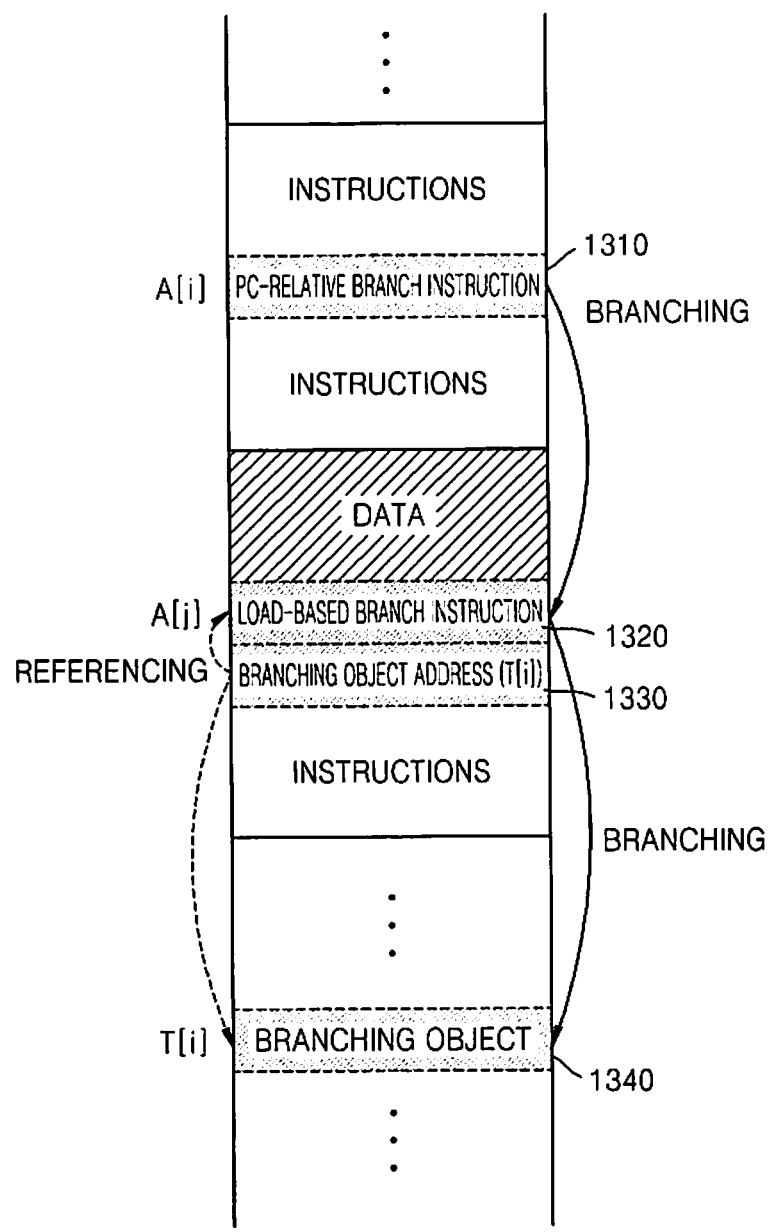
FIG. 13 illustrates a branching operation performed according to a PC-relative branch instruction and a load-based branch instruction, according to an embodiment of the present invention.

FIG. 13 illustrates a branching operation performed according to a PC-relative branch instruction 1310 and a load-based branch instruction 1320.

Referring to FIG. 13, when a distance between the PC-relative branch instruction 1310 and a branching object 1340 exceeds an offset range of the PC-relative branch instruction 1310, the load-based branch instruction 1320 and a branching object address 1330 are sequentially added at the end of executable code that is being generated. During execution, when it is branched to A[j] by the PC-relative branch instruction 1310, the load-based branch instruction 1320 references a branching object address T[i] stored in a next address 1330 so as to branch to the branching object 1340.

In the above-described manner, a branching step may be performed twice when one branch instruction is required, and thus the memory capacity and execution time may be increased. However, in real execution environments, branching frequency within the offset range such as branching within executable code is very high, and addition of a load-based branching instruction seldom occurs, and thus, gains by the addition of a load-based branch instruction and a branching object address are far greater than losses.

The invention can also be embodied as computer readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and the like (such as data transmission through the Internet). The computer-readable recording medium can also be distributed over network coupled computer systems so that the computer readable code is stored and executed in a distributed fashion.

While the present invention has been particularly shown and described with reference to embodiments thereof, it will be understood by those of ordinary skill in the art that various changes in form and details may be made therein without departing from the spirit and scope of the present invention as defined by the following claims and their equivalents.

What is claimed is:

1. A method of dynamically generating a machine code, the method comprising:
   sequentially storing generated instructions in a first buffer;
   sequentially storing data in a second buffer, when the generated instructions reference data; and
   flushing the first buffer and the second buffer to executable code when a distance between a data-referencing instruction among the instructions stored in the first buffer and data referenced by the data-referencing instruction among the data stored in the second buffer reaches a limit of an offset range of the data-referencing instruction, the distance being a distance between the data-referencing instruction and the data referenced by the data-referencing instruction when the data-referencing instruction and the data referenced by the data-referencing instruction are added to the executable code.

2. The method of claim 1, wherein the flushing comprises:
   sequentially adding the generated instructions, a branch instruction for branching to a next code area, and the data to the executable code.

3. The method of claim 1, wherein the flushing comprises sequentially placing the generated instructions, a branch instruction for branching to a next code area, and the data in the executable code in a positive number offset mode, and sequentially adding the data and the generated instructions to the executable code in a negative number offset mode.

4. The method of claim 1, wherein when a data-referencing instruction having a relatively small offset and a data-referencing instruction having a relatively great offset are intertwined in the generated instructions,
   the storing of data comprises storing data corresponding to the data-referencing instruction having the relatively small offset and data corresponding to the data-referencing instruction having the relatively great offset in a separate buffer; and
   the flushing comprises sequentially adding the data corresponding to the data-referencing instruction having the relatively small offset, to the executable code, to be adjacent to the generated instructions.

5. The method of claim 4, wherein the flushing comprises:
   sequentially adding the generated instructions, a branch instruction for branching to a next code area, the data corresponding to the data-referencing instruction having the relatively small offset, and the data corresponding to the data-referencing instruction having the relatively great offset, to the executable code in a positive number offset mode, and sequentially adding the data corresponding to the data-referencing instruction having the relatively great offset, the data corresponding to the data-referencing instruction having the relatively small offset, and the generated instructions to the executable code in a negative number offset mode.

6. A non-transitory computer-readable recording medium having embodied thereon a program for executing a method of dynamically generating a machine code, the method comprising:
   sequentially storing generated instructions in a first buffer;
   sequentially storing data in a second buffer, when the generated instructions reference data; and
   flushing the first buffer and the second buffer to executable code when a distance between a data-referencing instruction among the instructions stored in the first buffer and data referenced by the data-referencing instruction among the data stored in the second buffer has reached a limit of an offset range of the data-referencing instruction, the distance being a distance between the data-referencing instruction and the data referenced by the data-referencing instruction when the data-referencing instruction and the data referenced by the data-referencing instruction are added to the executable code.

7. An apparatus for dynamically generating a machine code, the apparatus comprising:
   a hardware first buffer;
   a hardware second buffer; and
   a control unit that sequentially stores instructions in the first hardware buffer, wherein when an instruction references data, the control unit sequentially stores the data in the second hardware buffer, and flushes the first hardware buffer and the second hardware buffer to executable code when a distance between the data-referencing instruction among the instructions stored in the first hardware buffer and data referenced by the data-referencing instruction among data in the second hardware buffer corresponding to the data-referencing instruction has reached a limit of an offset range of the data-referencing instruction, the distance being a distance between the data-referencing instruction and the data referenced by the data-referencing instruction when the data-referencing instruction and the data referenced by the data-referencing instruction are added to the executable code.

8. The apparatus of claim 7, wherein the control unit performs flushing by sequentially adding the instructions, a branch instruction for branching to a next code area, and the data to the executable code.

9. The apparatus of claim 7, wherein a flag indicates whether the control unit generates the instructions, generates the data, and flushes in a positive number offset mode or in a negative number offset mode.

10. The apparatus of claim 7, wherein the control unit generates the instructions, generates the data, and flushes while alternately converting between a positive number offset mode and a negative number offset mode, and when performing the flushing in the positive number offset mode, the control unit sequentially adds the instructions, a branch instruction for branching to a next code area, and the data to the executable code, and when performing flushing in the negative number offset mode, the control unit sequentially adds the data and the instructions to the executable code.

11. The apparatus of claim 7, further comprising a third hardware buffer, wherein when a data-generating instruction having a relatively small offset and a data-generating instruction having a relatively great offset are intertwined, the control unit separately stores the data corresponding to the data-generating instruction having a relatively great offset in the second hardware buffer and the data corresponding to the data-generating instruction having a relatively small offset in the third hardware buffer, and when flushing, the control unit adds the data corresponding to the data-generating instruction having the relatively small offset to the executable code, adjacent to the instructions.

12. The apparatus of claim 11, wherein the control unit generates the instructions, generates the data, and flushes while alternately converting between a positive number offset mode and a negative number offset mode, and when flushing in the positive number offset mode, the control unit sequentially adds the instructions, a branch instruction for branching to a next code area, and the data to the executable code, and when flushing in the negative number offset mode, the control unit sequentially adds the data corresponding to the data-generating instruction having the relatively great offset, the data corresponding to the data-generating instruction having the relatively small offset, and the instruction to the executable code.

* * * * *